United States Patent [19]

Francis, Jr. et al.

[11] Patent Number: 4,519,684
[45] Date of Patent: May 28, 1985

[54] PHOTO FLASH LAMP

[76] Inventors: Ralph M. Francis, Jr., 2937 Washington Ave., Racine, Wis. 53405; Jerome C. Isaacson, 9033 Hulda Dr., Sturtevant, Wis. 53177

[21] Appl. No.: 531,935

[22] Filed: Sep. 13, 1983

[51] Int. Cl.³ ............................................. G03B 15/03
[52] U.S. Cl. ................................... 354/145.1; 354/62
[58] Field of Search ................ 354/62, 63, 145.1, 292, 354/127.12, 127.11

[56] References Cited

U.S. PATENT DOCUMENTS

| | | | |
|---|---|---|---|
| 2,682,603 | 6/1954 | Dine et al. | 354/145.1 |
| 3,195,431 | 7/1965 | Augustin, Jr. et al. | 354/126 |
| 3,298,294 | 1/1967 | Manning | 354/62 |
| 3,367,253 | 2/1968 | Kuhns et al. | 354/145.1 |
| 4,123,768 | 10/1978 | Kilshaw et al. | 354/292 |
| 4,258,991 | 3/1981 | Kuraishi | 354/127.12 |
| 4,300,570 | 11/1981 | Stafl | 128/665 |

OTHER PUBLICATIONS

Soligor Auto Ringlight AR-20 Assembly Drawings by Soligor Corp., Publication date unknown, sheets A-E.

Primary Examiner—Russell E. Adams
Attorney, Agent, or Firm—Quarles & Brady

[57] ABSTRACT

An improved photo flash lamp, especially suited for medical photography includes a housing having a viewing tube extending therethrough and protruding therebeyond for mounting onto an adapter threaded into the lens of a single lens reflex camera. The housing carries a ring strobe concentric about the viewing tube for illuminating the subject matter photographed by the camera lens through the viewing tube. A set of high intensity illumination lamps are disposed within the housing about the viewing tube concentric within the ring strobe for providing shadowless illumination of the subject matter to enable proper focusing of the camera lens before the picture is taken. The ring strobe is interfaced to the camera by way of a flash-ready circuit which alerts the camera that the ring strobe is ready, thereby warning of a condition which would result in improper film exposure prior to when the ring strobe is fully recharged. The flash ready circuit includes a precision indicator mounted on the surface of the housing facing the camera operator to provide a visual indication as to the readiness status of the ring strobe.

6 Claims, 6 Drawing Figures

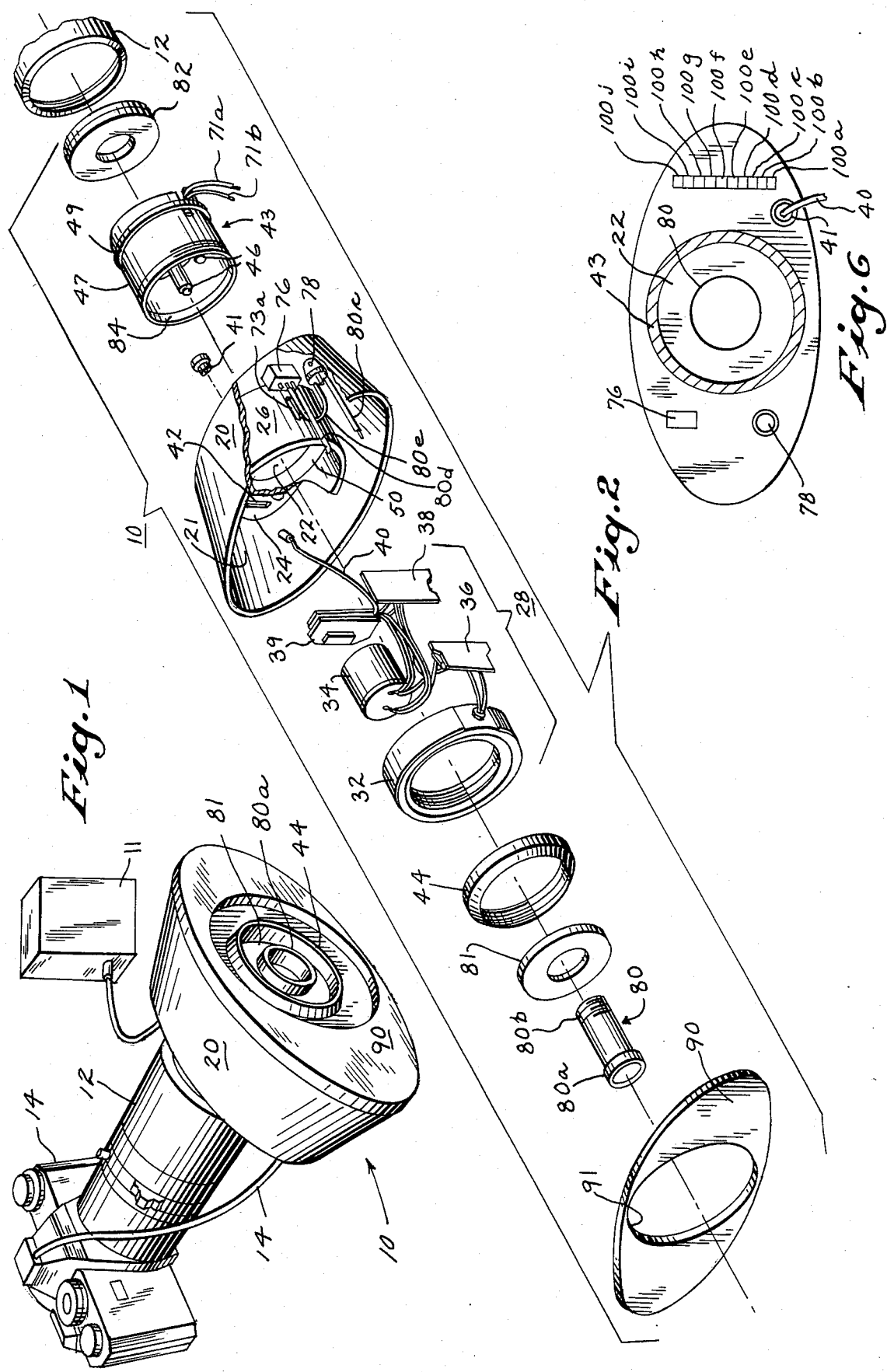

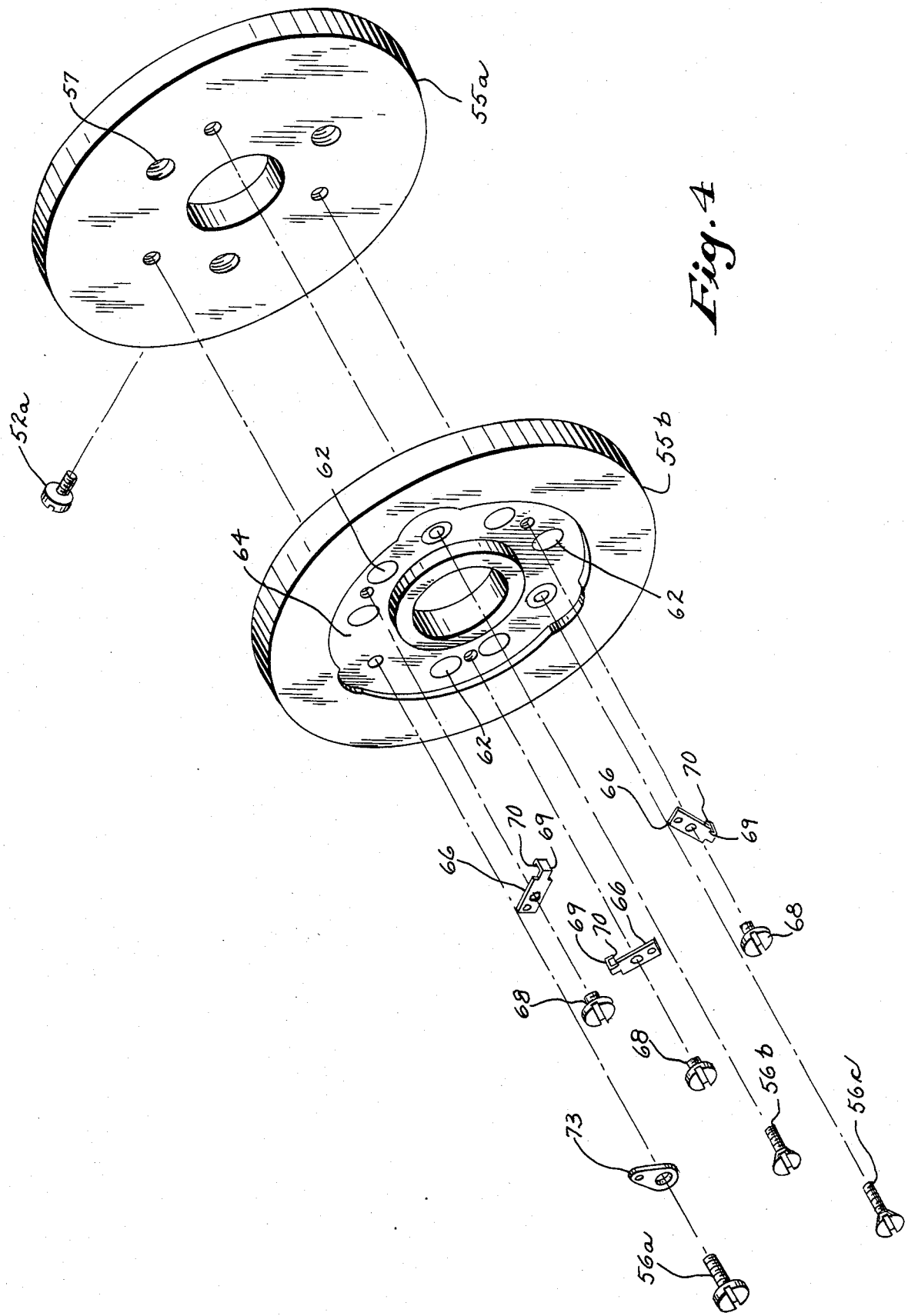

PHOTO FLASH LAMP

BACKGROUND OF THE INVENTION

This invention relates generally to an improved photo flash lamp and more particularly to an improved photo flash lamp which is provided not only with a strobe flash lamp but also is provided with constantly illuminated examination lamps to enable shadowless illumination of the subject prior to film exposure.

A recurrent problem in photography, and especially medical photography, is the inability to obtain sufficient illumination of the subject matter to be photographed to enable the subject matter to be brought into sharp focus prior to film exposure. In medical photography, the need to obtain a sharp focus of the subject matter is particularly important, especially where the photographic images are to serve as the basis for diagnostic screening, such as when practicing the diagnostic screening method for cervical cancer described and claimed in U.S. Pat. Nos. 4,300,570 issued to A. Stafl, hereinafter referred to as the Stafl patent. Unless the photographs obtained are clear and sharp, the usefulness of the photographs or slides for diagnostic screening purposes and particularly for the diagnostic screening of cervical cancer in accordance with the method taught by the Stafl patent, will be minimal.

Often, ambient room light is insufficient to provide proper illumination of the subject matter, thereby preventing sharp focusing of the subject matter in the camera lens. This is particularly true where the subject matter to be photographed is in a body cavity, as when practicing the method of diagnosing cervical cancer as taught by the Stafl patent. In the photographic apparatus shown in the Stafl patent, a fiber optic light source was mounted to the outer periphery of the case of the ring strobe to illuminate the cervix prior to film exposure so that the camera lens may be properly focused to obtain a sharp clear image of the cervix. While the use of a single fiber optic light source does illuminate the cervix, shadows and uneven illumination can still result and may prevent sharp focusing. Moreover, mounting the fiber optic light outside of the ring strobe of the camera, increases the likelihood that the fiber optic light source may be damaged during transport.

Another recurrent problem in photography and particularly medical photography is knowing when the flash lamp used to illuminate the subject matter during film exposure has been sufficiently recharged to permit subsequent film exposure. Most present photographic flash lamps utilize a Xenon flash tube which is ionized when a precharged capacitor is discharged across the Xenon flash tube in synchronization with the actuation of the camera shutter by the photographer to provide a high intensity burst of illumination during film exposure. Most commercially available flash lamps includes some type of indicator for alerting the photographer as to when the capacitor within the flash lamp has been sufficiently recharged to re-ionize the Xenon flash lamp tube to provide the illumination necessary for subsequent film exposure. However, such indicators are often unreliable and moreover, photographers sometimes inadvertently ignore the flash lamp indicator. Believing the flash lamp has been recharged, the photographer subsequently exposes the film, only to later learn that the flash lamp did not trigger because the photographer did not allow sufficient time to elapse for the flash lamp capacitor to be recharged. Thus, a reliable indicator for accurately indicating when the flash lamp has been recharged would be extremely useful.

Presently commercially available cameras are now provided with sophisticated electronic circuitry within the camera for alerting the photographer if sufficient light is available to obtain the proper film exposure. Thus, if the flash lamp could signal the camera that the flash lamp capacitor has been sufficiently recharged to trigger the Xenon flash tube, then the photographer would be alerted not to inadvertently expose the film until the flash lamp was ready.

BRIEF SUMMARY OF THE PRESENT INVENTION

It is an object of the present invention to provide an improved photo flash lamp for macro photography and is especially suited for medical photography.

It is yet a further object of the present invention to provide an improved photo flash lamp which includes a ring strobe lamp as well as a plurality of high intensity examination lights precisely positioned concentric within the ring strobe lamp to provide perfect, shadowless illumination of the subject matter to assure sharp focusing prior to film exposure.

It is another object of the present invention to provide a flash lamp having both a ring strobe lamp and high intensity examination lamps which are packaged for mounting to the lens of the camera for viewing therethrough.

It is yet a further object of the present invention to provide an improved photo flash lamp having a flash ready circuit coupled between the capacitor of the flash lamp and the camera for alerting the camera when the flash lamp capacitor has been sufficiently recharged to permit subsequent film exposure.

These and other objects are achieved by an improved photo flash lamp especially suited for medical purposes which comprises a housing that is provided with a viewing passage therethrough. Means are provided, in the form of an adapter threaded into the lens of the camera, and a viewing tube extending through the housing viewing passage and there beyond for threaded engagement in the adapter in the camera lens, for attaching the housing to the lens of the camera so that the housing viewing passage communicates with the lens. A ring strobe is carried by the housing concentric about the viewing passage and provides the intense burst of light to illuminate the subject matter during film exposure. A plurality of high intensity examination lamps, typically of the quartz-halogen type, are disposed in the housing about the periphery of the viewing passage for providing a source of constant illumination to enable the subject matter to be photographed to be brought into sharp focus prior to firing the ring strobe to expose the film. Both the ring strobe and the examination lamps are energized from a common power supply.

The improved photo flash lamp of the present invention is also advantageously provided with a flash ready circuit which senses the readiness of the ring strobe and alerts the camera as to when the ring strobe is ready to be refired to subsequently expose the film. The flash ready circuit includes a precision indicator mounted on the exterior of the flash lamp housing for providing a visual indication as to the readiness state of the ring strobe.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings.

FIG. 1 is a perspective view of the improved flash lamp of the present invention attached to the lens of a single lens reflex camera, the combination of the photoflash lamp and the camera being especially suited for medical photography and particularly for photography of the human cervix;

FIG. 2 is an exploded view of the flash lamp of FIG. 1;

FIG. 4 is an exploded perspective view of the socket assembly within the tubular lamp carrier of FIG. 3;

FIG. 6 is a rear view of the flash lamp of FIG. 1 illustrating the indicator of the flash ready circuit of FIG. 5.

DETAILED DESCRIPTION OF THE PREFERRED EMBODIMENT

Figure 3:
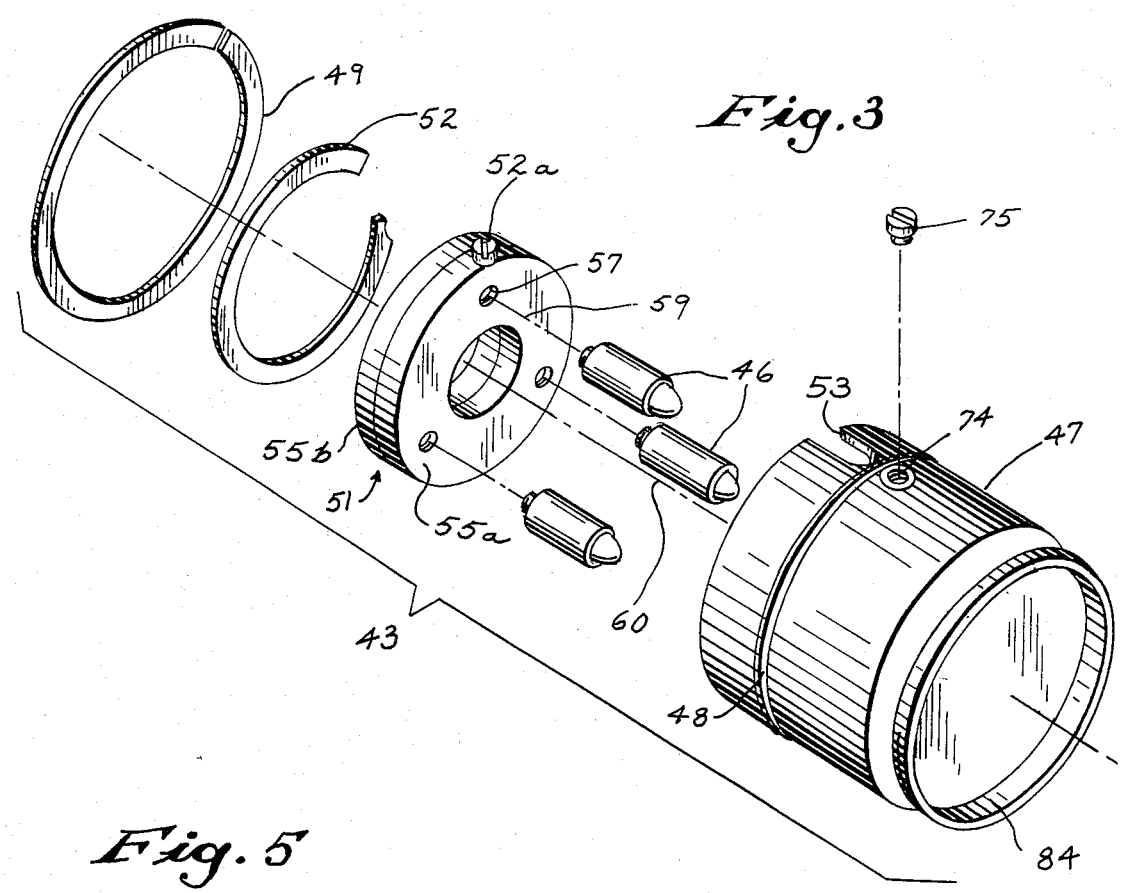
FIG. 3 is an exploded view of the tubular lamp carrier of the flash lamp of FIG. 2.

FIG. 1 illustrates an improved flash lamp 10 which is powered from a power supply 11 with a low d.c. voltage, typically 6 volts. As will be described, the lamp 10 provides not only an intense light burst to illuminate the subject matter during film exposure but also to advantageously provide a continuous high intensity, shadowless light source to enable illumination of the subject matter prior to film exposure. The flash lamp 10 of the present invention is attached to the forward end of a lens 12 carried by a camera 14 so that a viewing opening (described hereinafter) through the flash lamp 10 is in registration with the lens 12 to permit viewing of the subject matter through the flash lamp housing and the lens. In practice, the camera 14 is a single lens reflex camera which advantageously takes the form of an advanced, fully automated 35 mm single reflex camera such as for example, the Minolta X700 or X570 35 mm camera manufactured by Minolta Photo Corporation. The lens 12 carried by camera 14 typically comprises the combination of a 100 mm–200 mm telephoto lens and an extender which allows for macrofocusing as well as a near perfect depth of field with little or no operator adjustment.

The combination of the photo flash lamp 10 and power supply 11, and the camera 14 with its telephoto lens 12 form a photographic system especially suited for medical photography and particularly, for practicing the diagnostic method for cervical cancer detection described and claimed in U.S. Pat. No. 4,300,570 issued Nov. 17, 1981 to A. Stafl. Although the Stafl '570 patent describes a photographic system comprised of a 35 mm single reflex camera, a telephoto lens, and a flash lamp for photographing the cervix to enable cervical cancer detection, the improved flash lamp 10 of the present invention offers significant improvement over the flash lamp described in the Stafl '570 patent as will become better understood following a description of the flash lamp of the present invention.

Referring to FIG. 2, which is an exploded view of the flash lamp 10 of the present invention, the flash lamp 10 comprises a housing 20, typically taking the form of a truncated elliptical shell formed from molded plastic or the like. Housing 20 has an opening 21 in its forward end (the leftward end of the housing as illustrated in FIG. 2) which communicates with a viewing opening 22 in the rearward wall 24 of the housing. When the housing 20 of the flash lamp 10 is mounted to the lens of a camera, such as lens 12 of camera 14 in the manner described hereinafter, the viewing opening 22 is maintained in registration with the lens 12 to permit viewing of the subject matter to be photographed through the lens 12 and through the viewing opening 22 of the flash lamp 10. An annular wall 26 circumscribes the periphery of the viewing opening 22 and extends forwardly from the rear wall 24 of the housing 20. In the preferred embodiment, the wall 26 is formed of a section of PVC pipe cemented to the rear wall 24 of housing 20 in registration with viewing opening 22. However, it may be desirable to mold the housing 20 and wall 26 as a single integral element.

The flash lamp 10 of the present invention includes a ring strobe assembly 28 which, in the presently preferred embodiment, takes the form of a Soligor Model AR-20 ring strobe commercially available from Soligor Corporation. The ring strobe assembly 28 includes a Xenon ring strobe flash lamp 32, a capacitor 34 for storing the energy which ionizes the ring strobe flash lamp 32, a pulse trigger circuit board 36 which mounts the pulse trigger circuitry that energizes the ring strobe flash lamp 32 from the capacitor 34 in response to a trigger signal supplied thereto and an oscillator circuit board 38 which mounts an oscillator circuit which is supplied with 6 volt d.c. voltage from the power supply 11 to charge the capacitor 34 so that the capacitor may be fired from the pulse trigger circuit mounted on circuit board 36. Although not illustrated in FIG. 2, when the flash lamp 10 is fully assembled, the capacitor 34 is positioned at or near the extreme upper left of the housing 20 and is retained, typically by hot melt cement. The oscillator board 38 and the trigger board 36 are each positioned in the extreme lower right and extreme lower left, respectively of the housing 20 and are also each typically secured by hot melt cement or the like.

Associated with the ring strobe assembly 28, but not actually comprising a part of the Soligor Model AR-20 ring strobe comprising ring strobe assembly 28, is a flash ready circuit board 39. As will become better understood following a description of FIG. 5, the flash ready circuit board 39 carries a flash ready circuit which serves to interface the ring strobe assembly 28 to the camera 14 through the p.c. cord 40 which is coupled to the p.c. contacts on the camera 14 as illustrated in FIG. 1. Referring back to FIG. 2, a strain relief clamp 41 clamps the p.c. cord 40 to the rearward wall 24 of the housing 20. Additionally, the flash ready circuit on the circuit board 39 carries a flash ready indicator, described with respect to FIGS. 5 and 6, which is exposed to the operator through the opening 42 in the rearward wall 24 of the housing 20 to provide a visual indication of the energy magnitude stored by the capacitor 34 to apprise the photographer of the readiness state of the ring strobe assembly 28.

Still referring to FIG. 2, the flash lamp 10 includes a tubular lamp carrier 43 disposed in the housing 20 through the viewing opening 22 so that the forward end of the lamp carrier 43 extends beyond the forward edge of the annular wall 26 and through the bore of the ring strobe lamp 32. A collar 44 is threaded about the forward end of the tubular lamp carrier 43 to urge the ring strobe lamp 32 against the wall 26 to retain the ring strobe lamp 32 and the lamp carrier 43 within the housing 20. As will become better understood by reference to FIG. 3, the tubular lamp carrier 43 is so named because it carries at least one and preferably three or more high intensity, prefocused lamps 46 which are energized from the power supply 11 of FIG. 1 to provide a continuous source of illumination to enable the subject matter to be photographed to be brought into sharp focus prior to film exposure.

Referring now to FIG. 3, there is shown an exploded view of the tubular lamp carrier 43. The tubular lamp carrier 43 comprises a barrel 47 whose forward end (the rightwardmost end as illustrated in the figure) is of a slightly reduced diameter and is threaded to matingly engage the threaded bore of the collar 44 of FIG. 2. Adjacent to the rearward end of the barrel 47 is a notch 48 which serves to retain a snap ring 49. Turning to FIG. 2, when the barrel 47 of the tubular lamp carrier 43 is inserted through the viewing opening 22 and through the bore of the ring strobe lamp 32, the snap ring 49 seats against a shoulder 50 about the interior bore of the annular wall 26 so that the lamp carrier 43 and the ring strobe lamp 32 are retained in the housing 20 when the collar 44 is threaded about the forward end of the barrel 47 to bear against the ring strobe flash lamp 32 and urge it against the annular wall 26.

Each of the high intensity examination lamps 46 carried by the tubular lamp carrier 43 comprises a Welch-Allyn model 998085-3 pre-focused quartz-halogen bulb which has a color temperature consistent with that of the strobe lamp. The lamps 46 are retained in the lamp carrier 43 by a socket assembly 51 held concentric within the barrel 47. A snap ring 52 is inserted into the barrel 47 behind the socket assembly 51 to urge the socket assembly 51 against the reduced diameter end of the barrel 47 to retain the socket assembly 51 in the barrel. To prevent the socket assembly 51 from rotating in the barrel 47, the socket assembly 51 is provided with a radially extending, fillister head screw 52a which is received in an axially extending notch 53 in the rearward end of the barrel 47.

Turning now to both FIG. 3 and to FIG. 4, the socket assembly 51 comprises a pair of centrally bored discs 55a and 55b, which, as illustrated in FIG. 4, are secured in face-to-face relationship with one another by screws 56a, 56b and 56c. Disc 55a is typically constructed of an electrically conductive material, such as aluminum, for example, whereas disc 55b is constructed of a nonconductive material such as plastic or the like. The electrically conductive disc 55a is provided with equidistantly spaced axially extending screw-threaded passageways 57 for threadedly receiving the base 58 of a corresponding one of the high intensity examination lamps 46. Each of the screw-threaded lamp-receiving passageways 57 extends through the disc 55a and has a central axis 59 parallel to the central axis 60 through the center bore of the socket assembly 51. However, it may be desirable to cut and thread each of passageways 57 so that the axis 59 through each of the passageways 57, and the corresponding axis of each of the high intensity examination lamps 46 will be slightly inclined towards the central axis 60.

Referring now to FIG. 4, the nonconductive disc 55b is provided with equidistantly spaced axial extending passages 62 in alignment with each of the passages 57 in the disc 55a so that the base 58 of each of the high intensity examination lamps 46 extends through the passageway 57 in the conductive disc 55a and partially into the passageway 62 in the nonconductive disc 55b.

The nonconductive disc 55b is provided with an annular channel or groove 64 in its rearward face in communication with each of the axially extending passageways 62. Each of a set of electrical contacts 66 is secured in the channel 64 by a corresponding one of screws 68 so that each contact 66 is adjacent to a corresponding passageway 62. Each contact 66 is provided with a finger 69 which extends normally from the contact 66 into the associated passageway 62 in the nonconductive disc 55b when the contact 66 is secured in the channel 64 by its associated screw 68. The distal end of the finger 69 of each contact is provided with a flanged portion 70 which serves to contact the tip of the base (not shown) of an associated one of the high intensity examination lamps 46 of FIG. 3. Although not shown, each of the electrical contacts 66 is connected to each of the other of the contacts 66 and are then connected by way of a conductor 71a (FIG. 2) to the oscillator circuit board 38.

Still referring to FIG. 4, one of the screws, such as screw 56a which retains the nonconductive disc 55b to the conductive disc 55a, is provided with an electrical contact 73. Although not illustrated in FIG. 4, the electrical contact 73 is soldered to a conductor 71b (illustrated in FIG. 2) which is connected to the oscillator circuit board 38. When the oscillator circuit board 38 is supplied with power from the power supply 11, the conductors 71a and 71b supply a voltage to the socket assembly 51 to energize the high intensity examination lamps 46.

Turning to FIG. 2, when the lamp carrier is received through the viewing passage 22 of housing 20 so as to be concentric within wall 26, the conductors 71a and 71b extend through an axial slot 73a in the wall 26 for connection to the oscillator circuit board 38. The axial slot 73a extends rearwardly from the shoulder 50 for reasons which will become better understood below. As may now be appreciated, by mounting the examination lamps 46 within the lamp housing 20, the likelihood of breakage is reduced as opposed to a mounting arrangement whereby the lamps are mounted outside the housing.

Referring back to FIG. 3, a threaded bore 74 having a spot face is radially disposed into the barrel 47 slightly forwardly of the slot 53. The bore 74 receives a fillister head screw 75. Turning back to FIG. 2, during flash lamp assembly, the barrel 47 of the tubular lamp carrier 43 is inserted through the viewing opening 22 and into the bore of the annular wall 26 with screw 75 in alignment with the slot 73a in the annular wall 26 so that the head of screw 75 is received in the slot 73a. Once the screw head is received in the slot 73a, barrel 47 may not rotate.

Referring now to both FIG. 2 and to FIG. 6, the rear wall 24 of the housing 20 mounts an on/off switch 76 and a two conductor power input receptacle 78. Turning exclusively to FIG. 2, the switch 76, which is typically a single pole single throw rocker-type switch, has one of its terminals connected to one of the terminals of the power input receptacle 78 by a jumper 80e. The remaining terminal of the switch 76 and the remaining terminal of the power input receptacle 78 are each connected via a corresponding one of a pair of jumpers 80d and 80c to the oscillator board 38 of the strobe unit 28 which as will be recalled is connected by conductors 71a and 71b to lamps 46. Thus, when the power supply 11 is connected to the power input receptacle 78, and switch 76 is closed, then a voltage is applied both to the oscillator circuit board 38 of the ring strobe assembly 28 and to the lamps 46 carried by the lamp carrier 43.

Still referring to FIG. 2, the housing 20 is secured to the forward end of the lens 12 by a combination of a viewing tube 80, a filtering lens plate 81 and an adapter disc 82. The viewing tube 80 is provided with an enlarged head portion 80a and a rearward extending shaft portion 80b whose rearward most end is threaded for engaging the threaded bore of the adapter disc 82. The head portion 80a of the viewing tube 80 is larger than the bore through the lens plate disc 81 which receives the shaft portion 80b of the viewing tube. The outer diameter of the lens plate 81 is slightly smaller than the bore through the collar 44 so as to be received in a counter bore 84 (FIGS. 2 and 3) in the barrel 47. In assembly, the viewing tube 80 is disposed through the lens plate 81, and through the central bore of the tubular lamp carrier 43 to threadedly engage the adapter disc 82. In this way the head 80a of the viewing tube 80 urges the lens disc 81 into the counter bore 84 in the barrel 47 when the shaft 80b of the viewing tube is threaded into the disc 82. When the viewing tube 80 is threaded into adapter disc 82, the barrel 47 is urged against the disc 82, so that the photo flash lamp 10 is thus mounted to the lens 12.

Although the inside diameter of the viewing tube 80 is typically much smaller than the outside diameter of the lens 12, the actual optical opening of the particular embodiment of lens 12 is approximately equal to the inside diameter of the viewing tube. Additionally, the aperture of the lens 12 is usually set very small (at f32 or greater) to maintain a long depth of field. Thus the narrow diameter of the viewing tube does not significantly impair viewing of the subject matter to be photographed through the lens. Once the viewing tube has been threaded into the bore of the adapter disc 82, a front plate 90 having an opening 91 therethrough, is glued to the housing 20 to overlie the opening 21 with its opening 91 in registration with the viewing opening 22 to seal the housing 20. With the front plate 90 in place, the various components of the flash lamp 10 are sealed from exposure. Although the front plate 90 is typically cemented to the housing 20 so as to seal the housing, access to the high intensity bulbs 46 may be gained by unthreading the viewing tube 80 from the adapter disc 82 and then removing the lens plate 81 to expose the lamps 46.

In practice, the lens plate 81 is typically constructed from a plastic material, such as LEXAN plastic, and advantageously serves to prevent body contact with the examination lamps 46 of FIGS. 2 and 3. Although the particular embodiment of lamps 46 have been chosen for their low power drain and heat dissipation, the lamps do radiate some heat so it is desirable to protect against lamp contact. The heat that is radiated by the lamps 46 is dissipated by the electrically conductive disc 55b of socket assembly 51. In addition, it may be desirable to manufacture the barrel 47 of a heat conductive material such as aluminum so that the heat from the lamps 46 will be dissipated by not only the conductive plate 55b, but by the barrel 47 as well.

Figure 5:
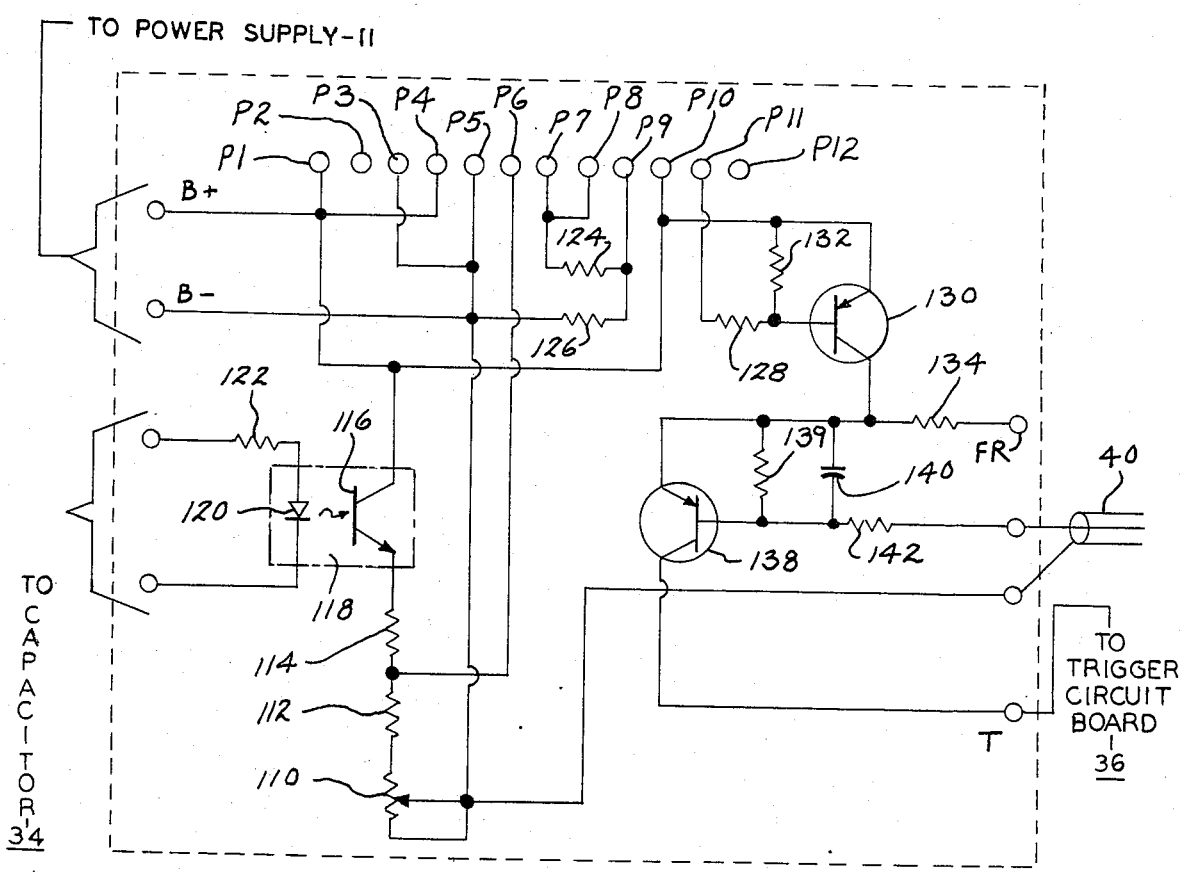
FIG. 5 is a schematic view of the flash ready circuit of the flash lamp of FIG. 1.

Referring now to FIG. 5, there is shown the schematic details of the flash ready circuit carried on the flash ready circuit board 39. The flash ready circuit includes a flash ready indicator 100 which provides a visual indication of the readiness state of the ring strobe 28 in accordance with the energy stored in capacitor 34 as determined by the voltage level thereacross. In the presently preferred embodiment, the flash ready indicator 100 takes the form of a National Semiconductor model NSM 3915 L.E.D. bar graph array which includes 10 light emitting diodes (l.e.d.'s) 100a–100j (FIG. 6) which are lit in succession as the analog input voltage at the input of the bar graph array increases past each of a plurality of prescaled threshold values. Turning now for a moment to FIG. 2, to enable the 10 l.e.d.'s 100a–100j (FIG. 6) of the bar graph array 100 of FIG. 5 to be observable through the rear wall 24 of housing 20, the L.E.D. bar graph array 100 of FIG. 5 is mounted to the rear face of the flash ready circuit board 39 and the flash ready circuit 39 is mounted to the rear wall 24 of the housing 20 in registration with the opening 42 through the wall 24 so that the l.e.d.'s 100a–100j (FIG. 6) of the L.E.D. bar graph array 100 are exposed through the opening 42.

As illustrated in FIG. 6, the L.E.D's 100a–100j of the L.E.D. bar graph array 100 are arranged vertically with the top most l.e.d. 100j being illuminated once the voltage at the L.E.D. bar graph array 100 input exceeds the highest prescaled threshold point whereas the bottommost l.e.d. 100a is illuminated once the voltage input at the L.E.D. bar graph array 100 increases past the lowest prescaled threshold value.

Returning to FIG. 5, the L.E.D. bar graph array 100 has its two positive power inputs $V_{LED}$ and V+ which terminate at pins P1 and P4, respectively, coupled to the positive (B+) terminal of the power supply 11. The $R_{LO}$ input terminating at pin P5 of the L.E.D. bar graph array 100 is strapped to the ground input which terminates at pin P3 and is also coupled to the negative (B−) terminal of the power supply 11. The wiper arm and one of the fixed resistance terminals of a potentiometer 110 (which is typically 20K ohms in value) is coupled to the pin P5 of the bar graph array 100. As will become better understood hereinafter, the potentiometer 110 regulates the voltage input to the bar graph array 100. Potentiometer 110 has its remaining fixed resistance terminal coupled through the series combination of a pair of resistors 112 and 114, (typically 10K and 4.7K ohms, respectively,) to the emitter of a phototransistor 116 within an optical isolator 118.

Phototransistor 116 has its collector coupled to the B+ terminal of the power supply 11 and is rendered conductive by a light emitting diode 120 embodied within the optical isolator 118 in registration with the phototransistor. Below the level of phototransistor 116 saturation, the magnitude of the phototransistor emitter current, and hence the voltage across each of fixed resistances 112 and 114 and potentiometer 110 varies in accordance with the intensity of the illumination of the light from emitting diode 120 impinging upon the phototransistor 116. The light emitting diode 120 is coupled in series with a resistor 122 (typically 470K ohms) across the terminals of the capacitor 34 of FIG. 2 so that the voltage across the light emitting diode 120 and hence, the intensity of its illumination varies proportionally to the voltage across the capacitor. Thus the intensity of the illumination of the l.e.d. 120 and hence the magnitude of the emitter current of phototransistor 116, is representative of the magnitude of the energy stored by the capacitor.

The signal input of the L.E.D. bar graph array 100 which terminates at pin P6 is coupled to the junction between resistors 112 and 114. The resistors 114 and 112, together with potentiometer 110, serve as a voltage divider to provide the L.E.D. bar graph with a voltage proportional to the phototransistor 116 emitter current. As may now be appreciated, the emitter current of phototransistor 116 is proportional to the voltage across the capacitor 34 so that the voltage supplied to the signal input (pin P6) of the L.E.D. bar graph 100 array varies in accordance with the magnitude of the energy stored by the capacitor. In practice, the emitter current of the phototransistor 116 varies antilogrithmically with the voltage across the capacitor 34. In contrast, the threshold values of the L.E.D. bar graph array vary logarithmically, so that as a result, the L.E.D. bar graph array 100 provides a linear analog display of the voltage level across the capacitor. Thus, the l.e.d.'s 100a–100j (FIG. 6) provide a representation of the magnitude of energy stored by the capacitor 34. By observing the display provided by the l.e.d. s 100a–100j of FIG. 6, the photographer is accurately apprised of the exact voltage level across the capacitor. Since the capacitor stored energy magnitude varies with the capacitor voltage, the L.E.D. bar graph array 100 accurately alerts the photographer when sufficient charge has been stored by the capacitor 34 of FIG. 1 to fire the ring strobe lamp 32 to illuminate the subject matter to obtain proper exposure.

The L.E.D. bar graph 100 is capable of providing both a bar type display and a dot type display. However, a bar type display is much more desirable and to this end, the mode input which terminates at pin P10 of the L.E.D. bar graph array is strapped to pins P4 and P1 so that the mode input terminating at pin P10 is supplied with a positive voltage from the power supply to cause a bar graph rather than a dot display. The intensity of the L.E.D.'s 100a–100j (FIG. 6) of the L.E.D. bar graph array 100 is established by the value of a resistor 124 coupled between the L.E.D. bar graph array 100 reference output terminating at pin P9 and the reference adjust input terminating at pin P8 which is strapped to the $R_{HI}$ input terminating at pin P7. Typically, resistance 124 comprises a 1.5K ohm resistance. The magnitude of the voltage level which is displayed by the L.E.D. bar graph array is established by the ratio of the ohmic value of resistance 126, which is coupled between the reference adjust input terminating at pin P9, and the B− terminal of the power supply, to the ohmic value of the resistor 124. In practice, selecting resistance 126 of a 2.7K ohm resistor has been found to yield satisfactory results.

In addition to providing the operator with a visual display indicative of the readiness state of the ring strobe assembly 28 of FIG. 2, the flash ready circuit embodied on the flash ready circuit board 39 also advantageously provides a flash ready signal which may be supplied to an automated camera, such as the Minolta X700 or X570 camera comprising the camera 14 of FIG. 1 to alert the camera as to when the strobe is ready to be fired. In the presently preferred embodiment of the flash ready circuit, the flash ready signal is advantageously derived from the L.E.D. bar graph array 100 as the L.E.D. bar graph array 100 provides an output, terminating at pin P11, which is driven from a high impedance to a low impedance when the second highest l.e.d., which is l.e.d. 100i of FIG. 6, is rendered conductive as occurs once the L.E.D. bar graph array input voltage exceeds the second highest threshold value. The L.E.D. output terminating at pin P11 of the L.E.D. bar graph array 100 is coupled through a resistance 128 (typically 1.5K ohms in value) to the base of a PNP transistor 130, typically a 2N5226 transistor whose emitter is coupled to the B+ terminal of power supply 11. A bias resistor 132 (typically 10K ohms in value) is coupled between the B+ power supply terminal and the junction between the transistor base and resistance 128 to supply the bias for the transistor 130. When the input voltage to the L.E.D. bar graph array 100 exceeds the second highest threshold value, the L.E.D. output terminating at pin P10 of the L.E.D. bar graph array 100 provides a low impedance path to the B− power supply terminal, thereby causing the transistor 130 to be forward biased and conductive. The collector of the transistor 130 is coupled through a load resistor 134 to the flash ready output terminal (FR) which is coupled to the flash ready input of the camera 14 so that when transistor 130 becomes forward biased and conductive, a voltage appears at the flash ready (FR) terminal (as measured with respect to the B− power supply terminal) to alert the camera that sufficient charge has been stored in the capacitor to fire the ring strobe lamp 32 so as to obtain the desired illumination for exposure.

The flash ready circuit is also coupled to the camera p.c. receptacle by way of the p.c. cord 40 of FIG. 1. When the camera shutter is opened, a completed circuit path appears between the shield and center lead of the p.c. cord 40. As will be seen hereinafter, this causes the flash ready circuit to supply a signal to the pulse trigger circuitry on pulse trigger circuit board 36 of FIG. 1 to fire the ring strobe lamp 32. To drive the pulse trigger circuit on pulse trigger circuit board 36, the flash ready circuit includes a transistor 138 whose emitter is coupled to the collector of transistor 130. A resistor 139 (typically 10K ohms in value) and a capacitor 140 (typically 0.01 microfarads in value) are coupled in parallel between the emitter and the base of transistor 138. Resistor 139 serves to bias off the transistor 138 during the intervals while transistor 130 is non-conductive. The p.c. cord 40 has its center lead coupled via a resistor 142 to the base of the transistor 138 whereas the shield of the p.c. cord is coupled to the B− power supply terminal. Once the transistor 130 has been forward-biased, then actuation of the camera shutter causes an electrical circuit to be completed between the center lead and shield of the p.c. cord 40, causing transistor 138 to be forward biased and conductive. The R.C. network of capacitor 140 and resistor 142 serves to suppress false triggering of transistor 138 by transients. With both transistors 130 and 138 now conductive, a voltage approximately equal to the B+ power supply voltage appears at the collector of transistor 138. The collector of transistor 138 is connected to the pulse trigger terminal (T) which is connected to the pulse trigger circuit on pulse trigger circuit board 36. When transistor 138 is rendered conductive upon actuation of the camera shutter, the pulse trigger circuit on pulse trigger circuit board 36 causes the capacitor 34 to be discharged across the strobe lamp 32 to fire the lamp of FIG. 2. As can now be appreciated, transistors 130 and 138 form a logical "AND" circuit and thus both transistors must be rendered conductive to signal the pulse trigger circuit on the pulse trigger circuit board 36 to trigger the strobe lamp 32. Although the flash ready circuit embodies an optical isolator such as optical isolator 118, to couple the capacitor 34 to the L.E.D. bar graph array, the optical isolator is only one form of a network that could be utilized to couple the capacitor to the L.E.D. bar graph array. For example, a resistor network could be employed in place of the optical isolator.

The foregoing describes an improved flash lamp which is provided with both a ring strobe and a plurality of high intensity, constantly illuminated examination lamps to enable illumination of the subject matter prior to film exposure to obtain a sharp focus.

While only certain preferred features of the invention have been shown by way of illustration, many modifications and changes will occur to those skilled in the art. For example, instead of employing a ring strobe, it may be desirable to utilize separate strobe lamps or lamp segments. Also, it may be desirable to utilize a single high intensity illumination lamp and a fiber optic system for dispersing the light about the viewing tube. It is therefore understood that the appended claims are intended to cover all such changes and modifications as fall within the true spirit of the invention.

What is desired secure by United States Letters Patent is:

1. An improved photo flash lamp especially suited for macro-photography comprising:
   (a) a ring strobe lamp assembly;
   (b) a housing having a viewing passage therethrough, said housing comprising:
   a shell having an opening at one end thereof opposite to, but in communication with said housing viewing passage;
   an annular wall circumscribing said viewing opening and extending toward said shell opening so as to be adjacent to, and concentric with said ring strobe lamp assembly;
   a tubular light source carrier disposed in said housing viewing passage concentric within said housing annular wall and extending through said ring strobe lamp assembly for carrying said light source means;
   collar means for engaging the forward end of said lamp carrier to retain said ring strobe lamp assembly against said annular wall; and
   a cover having an opening therethrough for overlying the opening into said shell so that the viewing passage through said shell communicates with the opening through said cover;
   (c) means for attaching said housing to the lens of a camera so that said housing viewing passage communicates with the camera lens;
   (d) high intensity examination light source means held in said housing about said viewing passage for providing a source of constant illumination to enable the subject matter to be photographed to be brought into sharp focus by the lens prior to subject matter illumination by said ring strobe lamp assembly; and
   power means for energizing both said ring strobe lamp assembly and said examination light source means.

2. The invention according to claim 1 wherein said light source means comprises a plurality of high intensity examination lamps and wherein a tubular light source carrier comprises:
   a barrel;
   a snap ring concentric around said barrel for seating said barrel concentric within said annular wall; and
   a lamp socket concentric within said barrel and having an opening therethrough in communication with said viewing passage, said lamp socket retaining each of said examination lamps about the periphery of said opening through said lamp socket and electrically connecting said examination lamps to said power supply.

3. The invention according to claim 2 wherein said lamp socket comprises:
   an electrically conductive disc having a central opening therethrough in communication with said housing viewing passage and having a plurality of examination lamp receiving sockets extending therethrough concentric about said central disc opening for receiving the base portion of each of said examination lamps so that the tip of each lamp extends slightly therebeyond and for connecting the base portion of each of said examination lamps to said power supply;
   a nonconductive disc mounted adjacent to said electrically conductive disc, said having a central opening therethrough in communication with the central opening through said electrically conductive disc and having a plurality of passages therethrough concentric about said central opening and each axially aligned with a separate one of said lamp receiving sockets in said conductive disc; and
   a plurality of electrical contacts each carried by said nonconductive disc so as to each be in electrical contact with the tip of each of said examination lamps for electrically connecting the tip of each of said examination lamps to said power supply.

4. The invention according to claim 1 further including a flash ready circuit located within said housing and coupled to said strobe lamp assembly for providing a visual indication of the energy magnitude stored by said strobe lamp assembly.

5. The invention according to claim 4 wherein said flash ready circuit comprises:
   an optical isolator coupled to said strobe lamp assembly for providing an output signal which varies in accordance with the amount of electrical energy stored by said strobe lamp assembly;
   a charge indicator coupled to said optical isolator for providing a visual indication of the amount of energy stored by said strobe lamp assembly in accordance with said optical isolator output signal and said charge indicator providing an electrical output signal when the amount of electrical energy stored by said strobe lamp assembly exceeds a predetermined level;
   a first circuit responsive to the output signal of said charge indicator for providing a flash ready signal to a camera to indicate that sufficient energy has been stored by said strobe lamp assembly to permit strobe firing; and
   a second circuit responsive to the output signal of said first circuit for coupling said camera to said strobe lamp assembly in response to the occurrence of said first circuit output signal to permit said strobe lamp assembly to be fired in response to actuation of the camera.

6. The invention according to claim 1 wherein said means for attaching said housing to the lens of the camera comprises:
   an adapter disc having a central bore and a threaded periphery for engaging the threads on the lens of the camera;

a viewing tube having an enlarged head portion and a depending shaft extending through said strobe lamp assembly and said housing viewing opening for threaded engagement in the central threaded bore of said adapter; and a lens plate carried on said viewing tube and urged against said light source carrier by said viewing tube to maintain said light source carrier in said housing and to secure said housing to the camera lens when said viewing tube bears against said lens plate upon threaded engagement of said viewing tube shaft with said adapter.

* * * * *